United States Patent
Aarras et al.

(10) Patent No.: US 10,657,297 B2
(45) Date of Patent: May 19, 2020

(54) PART NUMBER CONSOLIDATION IN PRINTED CIRCUIT BOARD ASSEMBLY DESIGN

(71) Applicant: Mentor Graphics Corporation, Wilsonville, OR (US)

(72) Inventors: Sami Aarras, Espoo (FI); Mark Laing, Lafayette, CO (US); Jeremy Schitter, Schirrhein (FR)

(73) Assignee: Mentor Graphics Corporation, Wilsonville, OR (US)

( * ) Notice: Subject to any disclaimer, the term of this patent is extended or adjusted under 35 U.S.C. 154(b) by 62 days.

(21) Appl. No.: 15/996,083

(22) Filed: Jun. 1, 2018

(65) Prior Publication Data

US 2019/0370417 A1    Dec. 5, 2019

(51) Int. Cl.
| | | |
|---|---|---|
| *G06F 30/10* | (2020.01) | |
| *G06F 30/13* | (2020.01) | |
| *G06F 30/18* | (2020.01) | |
| *G06F 30/327* | (2020.01) | |
| *G06F 17/50* | (2006.01) | |

(52) U.S. Cl.
CPC .............. *G06F 30/13* (2020.01); *G06F 30/18* (2020.01); *G06F 30/327* (2020.01)

(58) Field of Classification Search
CPC . G06F 17/505; G06F 17/5045; G06F 17/5004
USPC .................................................. 716/102, 137
See application file for complete search history.

(56) References Cited

U.S. PATENT DOCUMENTS

| | | | | |
|---|---|---|---|---|
| 4,706,187 A | * | 11/1987 | Arai et al. | G05B 19/4097 700/86 |
| 5,170,554 A | * | 12/1992 | Davis et al. | H05K 13/085 29/832 |
| 6,295,633 B1 | * | 9/2001 | Murakawa | G06F 17/5072 430/30 |
| 6,625,616 B1 | * | 9/2003 | Dragon et al. | G06Q 20/203 707/802 |

(Continued)

OTHER PUBLICATIONS

Hiller et al., "Optinnal Component Assignment and Board Grouping in Printed Circuit Board Manufacturing", Sep. 1998, INFORMS, Operations Research, vol. 46, No. 5, pp. 675-689.*

*Primary Examiner* — Sun J Lin
(74) *Attorney, Agent, or Firm* — Mentor Graphics Corporation (57) ABSTRACT

This application discloses a computing system implementing part number consolidation functionality can determine part numbers available for assignment to components represented in a printed circuit board assembly design based on electrical or physical characteristics associated with the components. The computing system can compare the available part numbers for the components to each other to determine a commonality among the available part numbers for a plurality of the components. The computing system also can compare the available part numbers for the components to part numbers associated with a different product to be manufactured at one or more manufacturing facilities. The computing system can assign one or more of the available part numbers to the components based, at least in part, on the commonality among the available part numbers, which consolidates the assigned part numbers to the components in the printed circuit board assembly design.

15 Claims, 4 Drawing Sheets

(56) References Cited

U.S. PATENT DOCUMENTS

2016/0371422 A1\* 12/2016 Kungsakawin et al. ...................... G06F 17/5045

\* cited by examiner

PART NUMBER CONSOLIDATION IN PRINTED CIRCUIT BOARD ASSEMBLY DESIGN

TECHNICAL FIELD

This application is generally related to electronic design automation and, more specifically, to part number consolidation in printed circuit board assembly design.

BACKGROUND

The development of electronic devices with printed circuit boards typically involves many steps known as a design flow. This design flow typically starts with a specification for a new electronic device to be implemented with a printed circuit board. The specification of the electronic device can be transformed into an electronic device design, such as a netlist, for example, by a schematic capture tool. The netlist may be specified in an Electronic Design Interchange Format (EDIF) or the like, which can describe nets or connectivity between various components represented in the electronic device design. The schematic capture tool also can assign a part number to each component represented in the electronic device design and generate a parts list that includes the unique part numbers assigned to the components in the electronic device design.

The design flow may utilize the electronic device design to generate a layout design for the electronic device. This procedure can be implemented in different ways, but typically, through the use of a layout tool, which can utilize the assigned part numbers to place and interconnect the parts into a representation of a printed circuit board. For example, the layout tool implemented in a computing system can present a graphical view of the printed circuit board and allow a designer to utilize the layout tool to place parts from a library onto the printed circuit board in the graphical view. The layout design can be utilized to manufacture the electronic devices implemented with the printed circuit boards.

Practically speaking, during manufacture of the electronic device, the more unique part numbers assigned to the components in the electronic device, the more expensive the electronic device will be to manufacture. For example, the manufacturer may have additional overhead costs for inventory and for the corresponding logistics of receiving and maintaining the inventory. The manufacturer also may scale a number of component feeding machines utilized during the manufacture of the electronic device based on the number of unique part numbers assigned to the components in the electronic device. Also, since many manufacturers set up their manufacturing line(s) for one product and then may reconfigure their line(s) for manufacturing a different product, the more unique part numbers utilized in manufacturing one product can translate into additional manufacturing down time due to reconfiguration of the manufacturing line(s) for the other product.

SUMMARY

This application discloses a computing system implementing part number consolidation functionality can determine part numbers available for assignment to components represented in a printed circuit board assembly design based on electrical or physical characteristics associated with the components. The computing system can compare the available part numbers for the components to each other to determine a commonality among the available part numbers for a plurality of the components. The computing system also can compare the available part numbers for the components to part numbers associated with a different product to be manufactured at a common manufacturing facility or across multiple manufacturing facilities. The computing system can assign one or more of the available part numbers to the components based, at least in part, on the commonality among the available part numbers, which consolidates the assigned part numbers to the components in the printed circuit board assembly design. Embodiments will be described below in greater detail.

DETAILED DESCRIPTION

Illustrative Operating Environment

Figure 1:
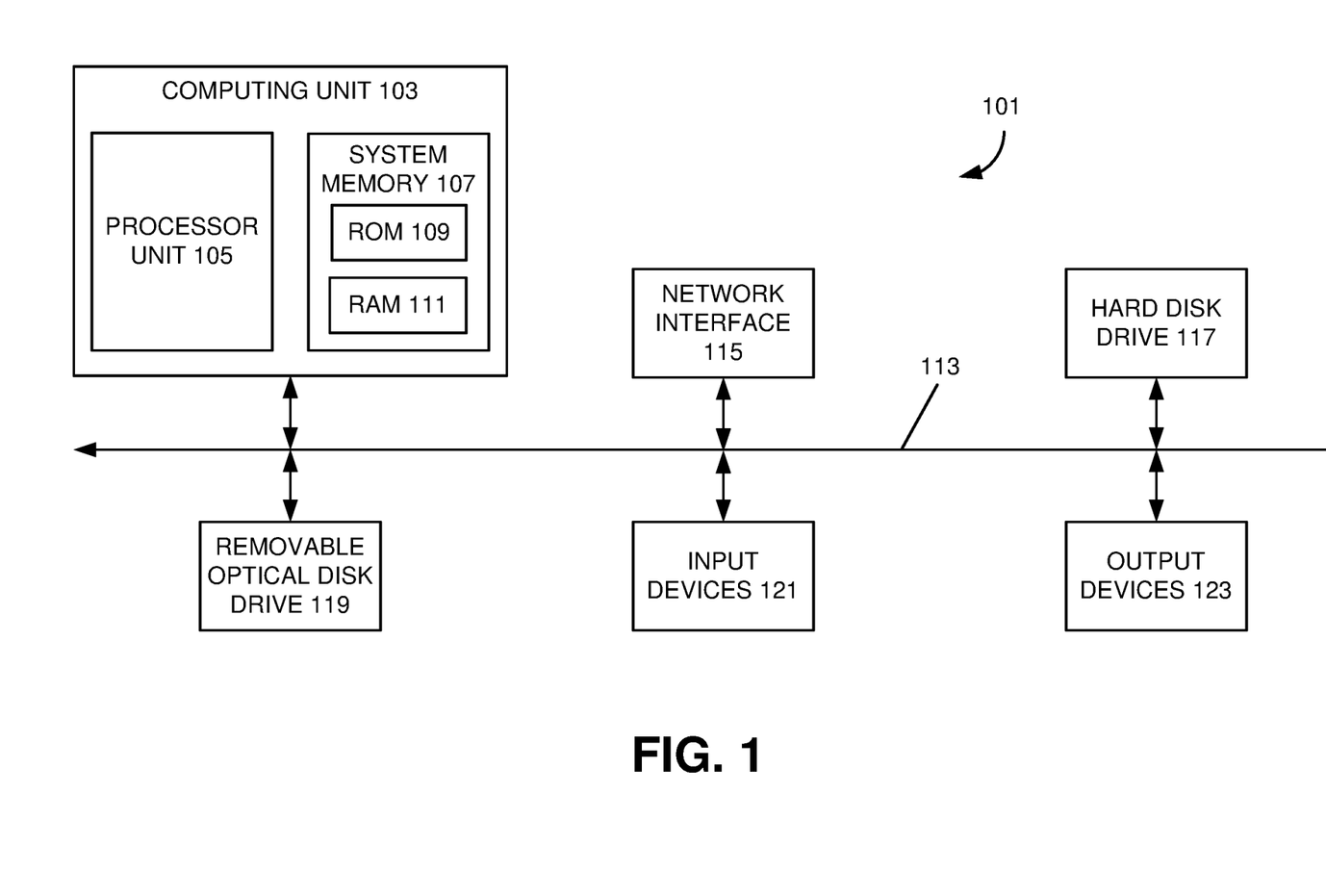
FIGS. 1 and 2 illustrate an example of a computer system of the type that may be used to implement various embodiments.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
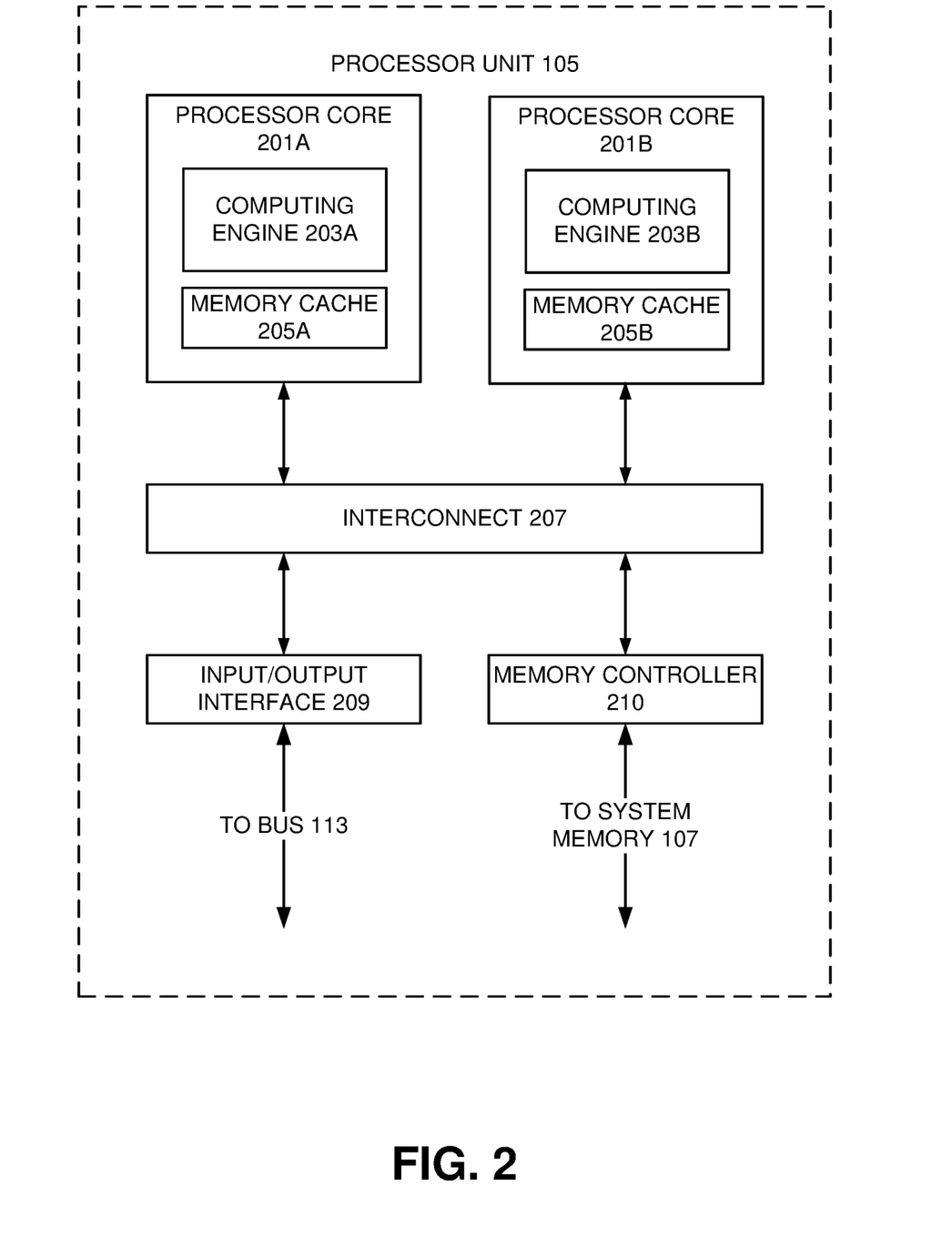

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Part Number Consolidation in Printed Circuit Board Assembly Design

Figure 3:
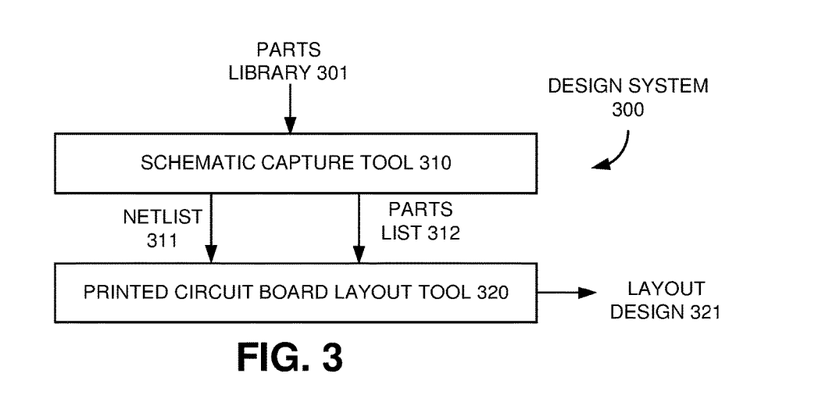
FIG. 3 illustrates an example of a design system with a schematic capture tool and a printed circuit board layout tool to consolidate part numbers for a printed circuit board assembly design according to various embodiments.

FIG. 3 illustrates an example of a design system 300 with a schematic capture tool 310 and a printed circuit board layout tool 320 to consolidate part numbers for a printed circuit board assembly design according to various embodiments. Referring to FIG. 3, the design system 300 can be a distributed design environment, which allow for a design of a printed circuit board assembly to be performed by different communicating tools or systems.

The design system 300 can include a schematic capture tool 310 to receive a parts library 301 having part numbers associated with parts that represent electronic components available for use in a printed circuit board assembly. In some embodiments, each part number can correspond to a set of one or more electronic components, for example, electrically and physically equivalent component in an approved vendor list. The part numbers can be associated with characteristics of the electronic components they represent, for example, types of the electronic components, the pins, ports, or interfaces of the electronic components, or the like. In some embodiments, the part numbers can be associated with electrical characteristics of the electronic components, such as resistance value, capacitance value, tolerance, power rating, or the like, and/or include physical characteristics of the electronic components, such as footprints of the electronic components, sizes of the electronic components, shapes of the electronic components, or the like.

The schematic capture tool 310 can generate a printed circuit board assembly design or a schematic design, which may be a logical design for the printed circuit board assembly, for example, represented at a schematic-level of abstraction. In some embodiments, the schematic capture tool 310 can generate a display presentation that, when presented by a display device, can provide a design environment for development of the schematic design. The schematic capture tool 310 can receive user input via a user interface, for example, a selection of one or more components for inclusion in the schematic design. The schematic capture tool 310 may include schematic diagrams of the selected components and interconnect them in response to the user input. The schematic capture tool 400 can convert the schematic diagrams and interconnections from the design environment into a netlist 311 for the schematic design. The netlist 311 can describe nets or connectivity between various components or instances represented in the schematic design, for example, which can be specified in an Electronic Design Interchange Format (EDIF), or the like.

The schematic capture tool 310 can identify groups of part numbers available to be assigned to components associated with the netlist 311. In some embodiments, the schematic capture tool 310 can review the parts library 301 to identify a list of part numbers and characteristics, such as electrical and/or physical characteristics, of the components corresponding to the part numbers. The schematic capture tool 310 can compare the electrical characteristics and, in some embodiments, the physical characteristics of the components to the descriptions in the parts library 301 to identify the group of part numbers available to be assigned to each component.

In some embodiments, the schematic capture tool 310 can identify ranges of compatible electrical characteristics and/or compatible physical characteristics for the components associated with the netlist 311. For example, when the component associated with the netlist 311 has a 5 k ohm resistance value and a tolerance of 5%, the schematic capture tool 310 can determine that the component could be assigned a part number for a resistor having a 5 k ohm resistance value and a tolerance with a range of zero to 5%. By identifying a range for the tolerance of the component, the schematic capture tool 310 can identify a group of part numbers available to be assigned to the component rather than assigning a part number having a 5 k ohm resistance value and a tolerance of 5% to the component.

The schematic capture tool 310 also can utilize the groups of available part numbers for the components to consolidate a quantity of part numbers assigned to components in the printed circuit board assembly design. For example, the schematic capture tool 310 can compare the groups of available part numbers for the components in the printed circuit board assembly design with each other to identify commonality or overlap in the part numbers. In some embodiments, the schematic capture tool 310 also can compare the groups of available part numbers against part numbers or groups of available part numbers associated with a different product to be manufactured at the same facility or at multiple manufacturing facilities as the printed circuit board assembly.

The schematic capture tool 310 can utilize the commonality or overlap in the groups of the part numbers to consolidation the group of available part numbers for the components or instances in the netlist 311. When the schematic capture tool 310 consolidates the groups of available part numbers to a single part number for a particular component, the schematic capture tool 310 can assign that part number to the component. In some embodiments, the schematic capture tool 310 can generate a parts list 312 that includes the assigned part numbers from the parts library 301. The parts list 312 also may include the groups of available part numbers, for example, to allow a downstream tool, such as the printed circuit board layout tool 320, to assign specific part numbers to the one or more of the components. Embodiments of the schematic capture design tool will be described below in greater detail with reference to FIG. 4.

Figure 4:
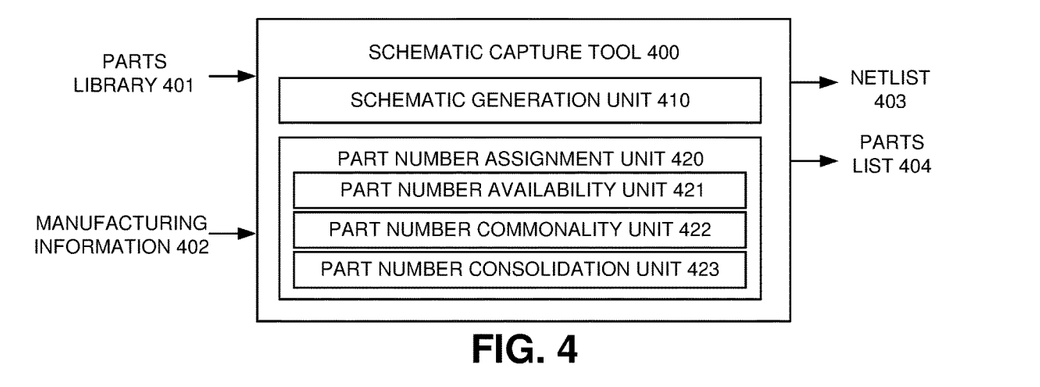
FIG. 4 illustrates an example of the schematic capture tool to consolidate part numbers for a printed circuit board assembly design according to various embodiments.

FIG. 4 illustrates an example of the schematic capture tool 400 to consolidate part numbers for a printed circuit board assembly design according to various embodiments. Referring to FIG. 4, the schematic capture tool 400 can receive a parts library 401 having part numbers associated with parts that represent electronic components available for use in a printed circuit board assembly, which can be similar to the parts library 301 described above in FIG. 3.

The schematic capture tool 400 also can receive manufacturing information 402 corresponding to at least one future manufacturer of a printed circuit board assembly. The manufacturing information 402, in some embodiments, can correspond to a listing of part numbers assigned to other products to be manufactured by the manufacturer, a listing of groups of part numbers available to be assigned to the other products, or the like. The schematic capture tool 400 can generate a printed circuit board assembly design, which can include a netlist 403 and a parts list 404. The netlist 403 and the parts list 404 can be similar to the netlist 311 and the parts list 312 described above in FIG. 3.

The schematic capture tool 400 can include a schematic generation unit 410 to generate a schematic design, which may be a logical design for the printed circuit board assembly, for example, represented at a schematic-level of abstraction. In some embodiments, the schematic generation unit 410 can generate a display presentation that, when presented by a display device, can provide a design environment for development of the schematic design. The schematic generation unit 410 can receive user input via a user interface, for example, a selection of one or more components for inclusion in the schematic design. The schematic generation unit 410 may include schematic diagrams of the selected components and interconnect them in response to the user input. The schematic generation unit 410 can convert the schematic diagrams and interconnections from the design environment into the netlist 403 for the schematic design.

The schematic capture tool 400 can include a part number assignment unit 420 to identify groups of part numbers available to be assigned to a components or instances in the netlist 403, consolidate the groups of part numbers, and then either assign part numbers to the components based on the consolidation or forward the consolidated groups of part numbers to a downstream tool, such as a printed circuit board layout tool for part number assignment. In some embodiments, the schematic capture tool 400 can generate the parts list 404, which includes the assigned part numbers or the consolidated groups of part numbers.

The part number assignment unit 420 can include a part number availability unit 421 to identify groups of part numbers available to be assigned to components associated with the netlist 403. In some embodiments, the part number availability unit 421 can identify characteristics, such as electrical and/or physical characteristics, of the components, for example, from the parts library 401.

The part number availability unit 421 can utilize the identified characteristics to generate ranges of compatible electrical and/or compatible physical characteristics for the components. The part number availability unit 421 can analyze the component characteristics to determine when a characteristic of the component has flexibility. For example, when a component has a specific power rating, such as a rating of 100 mV, the part number availability unit 421 can determine that the specific power rating corresponds to a minimum power rating and generate a power rating range accordingly. The part number availability unit 421 can utilize the ranges of compatible electrical and/or compatible physical characteristics to identify groups of part numbers available to be assigned to the components.

The part number assignment unit 420 can include a part number commonality unit 422 to determine commonality or overlap for the groups of part numbers available to be assigned to the components. In some embodiments, the part number commonality unit 422 can compare the groups of part numbers available to be assigned to the components against each other to determine commonality or overlap between part numbers among the components. In some embodiments, the part number commonality unit 422 also can compare the groups of part numbers available to be assigned to the components against assigned part numbers or groups of part numbers corresponding to products or designs in the manufacturing information 402.

The part number assignment unit 420 can include a part number consolidation unit 423 to utilize the commonality or overlap between available part numbers for the components to consolidate the groups of available part numbers for the components. In some embodiments, the part number consolidation unit 423 can consolidate a group of available part numbers to a single number, which can assign that single part number to a corresponding component. In other embodiments, the part number consolidation unit 423 can reduce a number of available part numbers in a subset of the group, which can be provided a downstream tool for assignment of a part number.

By expanding the availability of part numbers that could be assigned to a component, for example, determining ranges of characteristics to identify part numbers available for assignment and consolidating the available part numbers based on commonality among the part numbers, the part number assignment unit 420 can reduce a quantity of unique part numbers assigned to components in the printed circuit board assembly design. Further, by cross-comparing the available part numbers to other designs or products manufactured by the same manufacturer or multiple manufacturers, the part number consolidation can be tailored to reduce set-up and reconfiguration on a shop floor for the manufacturer or manufacturers.

Referring back to FIG. 3, the design system can include the printed circuit board layout tool 320 to receive the logical design of the printed circuit board assembly, such as the netlist 311 and the parts list 312 from the schematic capture tool 310, and convert the logical design into a physical design or layout design 321 of the printed circuit board assembly. The printed circuit board layout tool 320 can provide a design environment to lay out the netlist 311 into the layout design 321 by placing parts or components from a parts list 312 onto the representation of printed circuit board. The layout design 321 can describe the electronic device for the product in terms of various components placed and interconnected on a representation of a printed circuit board.

The printed circuit board layout tool 320 can output a display presentation that, when displayed by a display device, can provide an user interface to the design environment, allowing the printed circuit board layout tool 320 to generate the layout design 321 in response to user input. The display presentation can include a graphical display window including at least one representation of the layout design 321 and include various tools or embedded functionality that can allow placement of parts or components from the parts list 312 into the layout design 321.

The layout design 321 initially can represent a blank print circuit board, for example, having dimensions corresponding to one or more of the physical constraints. The printed circuit board layout tool 320 can receive user input, for example, based on the display presentation, which can prompt the printed circuit board layout tool 320 to perform various updates to the layout design 321 based on the netlist 311, such as place parts selected from the parts list 312 in the layout design 321, route traces between the placed parts, or the like. In some embodiments, the printed circuit board layout tool 320, in response to a user selection of a part from the parts list 312, can access a library to identify a component model corresponding to the selected part capable of being placed in the representation of the layout design 321.

When the part list 312 includes groups of available part numbers associated with components in the netlist 311, the printed circuit board layout tool 320 can compare physical characteristics associated with the groups of available part numbers for the components. In some embodiments, the printed circuit board layout tool 320 can determine the physical characteristics corresponding the groups of available part numbers, such as footprint, package size, connectors, or the like, and assign specific parts numbers to the components in the netlist 311 based, at least in part, on commonality in the physical characteristics or to satisfy physical design constraints associated with the layout process. Embodiments of the printed circuit board layout tool will be described below in greater detail with reference to FIG. 5.

Figure 5:
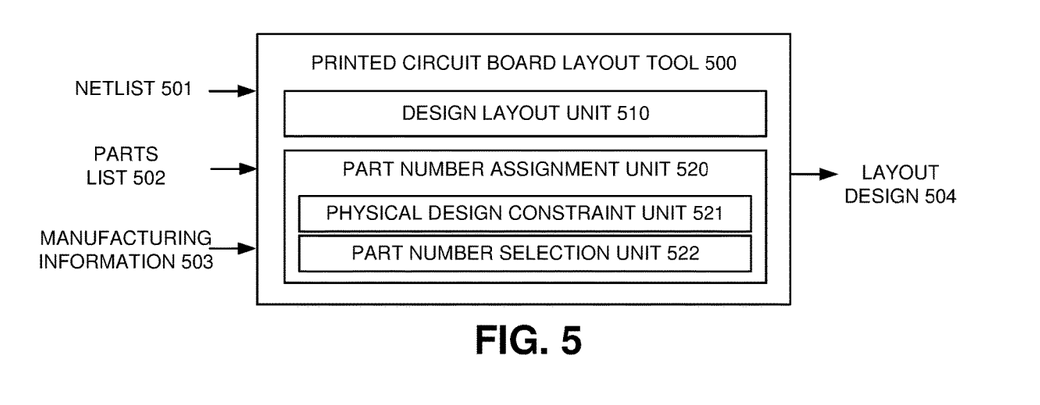
FIG. 5 illustrates an example of the printed circuit board layout tool to consolidate part numbers for a printed circuit board assembly design according to various embodiments.

FIG. 5 illustrates an example of the printed circuit board layout tool 500 to consolidate part numbers for a printed circuit board assembly design according to various embodiments. Referring to FIG. 5, the printed circuit board layout tool 500 can receive the logical design of the printed circuit board assembly, such as the netlist 501 and the parts list 502, for example, from a schematic capture tool, and convert the logical design into a physical design or layout design 504 of the printed circuit board assembly. The netlist 501 and the parts list 502 can be similar to the netlist 311 and the parts list 312 described above in FIG. 3.

The printed circuit board layout tool 500 also can receive manufacturing information 503 corresponding to at least one future manufacturer of a printed circuit board assembly. The manufacturing information 503, in some embodiments, can correspond to a listing of part numbers assigned to other products to be manufactured by the manufacturer, a listing of groups of part numbers available to be assigned to the other products, or the like. The manufacturing information 503 can be similar to the manufacturing information 402 described above in FIG. 4.

The printed circuit board layout tool 500 can include a design layout unit 510 to provide a design environment to layout the netlist 501 into the layout design 504 by placing parts or components from a parts list 502 onto the representation of printed circuit board. The layout design 504 can describe the electronic device for the product in terms of various components placed and interconnected on a representation of a printed circuit board.

The printed circuit board layout tool 500 can include a part number assignment unit 520 to determine the part list 502 includes at least one component associated with the netlist 501 that has not been assigned a part number, but instead has been correlated to a group of part numbers available to be assigned to the component. The part number assignment unit 520 can select one of the part numbers from the group of part numbers available for assignment to the component based, at least in part, on physical design constraints associated with generating the layout design 504 from the netlist 501 and parts list 502.

The part number assignment unit 520 can include a physical design constraint unit 521 to identify physical design constraints associated with generating the layout design 504 from the netlist 501 and parts list 502. In some embodiments, the physical design constraints can correspond to a space available to layout components on a printed circuit board, mechanical constraints, such as height limitations, fastener locations, mechanical device locations, enclosure dimensions, or the like.

The part number assignment unit 520 can include a part number selection unit 522 to determine an overlap or commonality in available part numbers across different components and/or across different products described in the manufacturing information 503 based, at least in part, on physical characteristics associated with the part numbers, such as footprint, package size, connectors, or the like. The part number selection unit 522 can select part numbers of the components to consolidate or limit a total number of part numbers assigned to the components in the layout design 504.

The part number selection unit 522 also can select the part numbers for assignment to the components based, at least in part, on the identified physical design constraints for the layout design 504. In some embodiments, the part number selection unit 522 can determine physical characteristics corresponding to the groups of available part numbers and determine an impact these different components with differing physical characteristics can have on the generation the layout design 504 given the identified physical design constraints for the layout design 504. By allowing the part number selection unit 522 to assign part numbers to components, the part number selection unit 522 can have the flexibility to select part numbers for assignment to reduce in a total number of unique part numbers in the layout design 504 and/or to ease satisfying the identified physical design constraints during the generation of the layout design 504.

Figure 6:
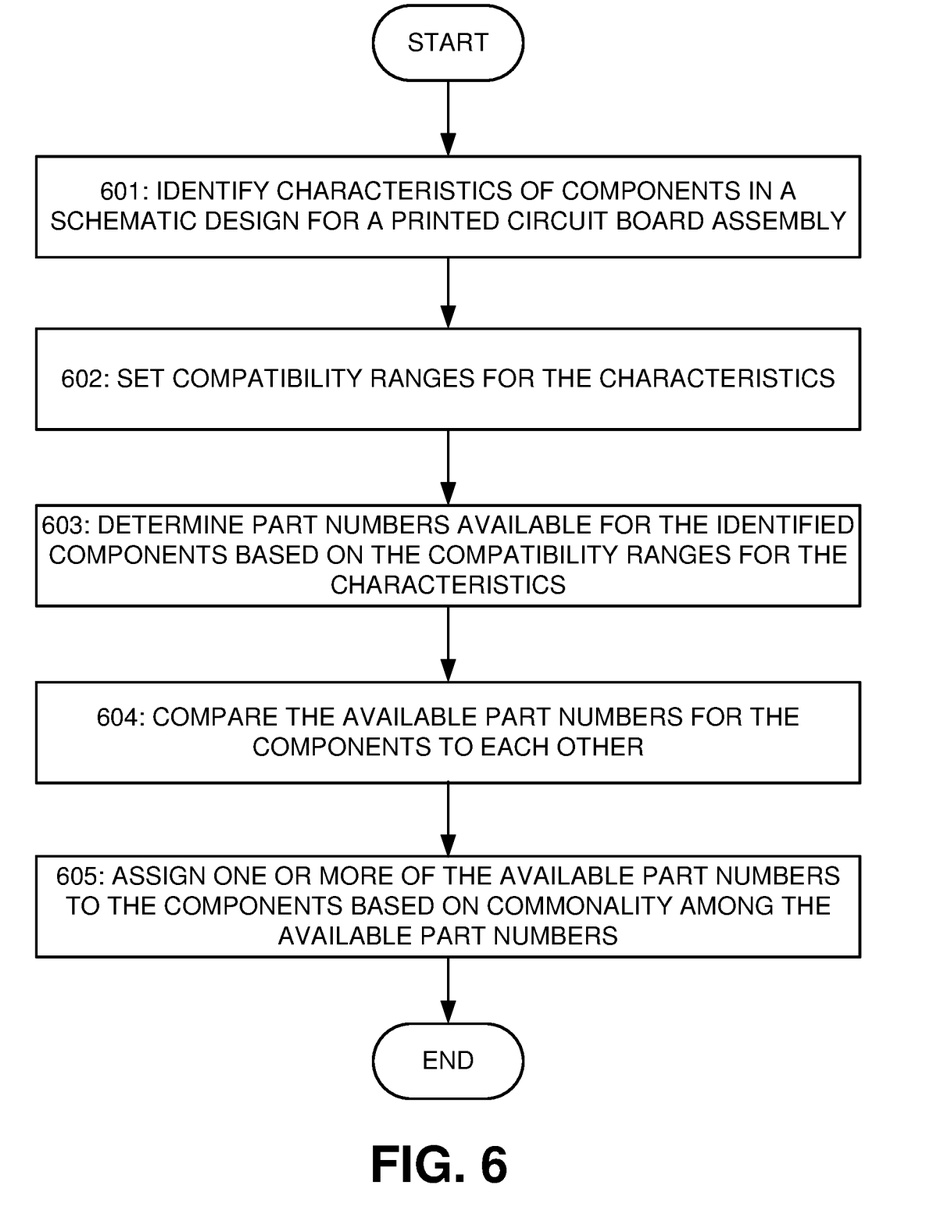
FIG. 6 illustrates an example flowchart for part number consolidation in printed circuit board assembly design according to various embodiments.

FIG. 6 illustrates an example flowchart for part number consolidation in printed circuit board assembly design according to various embodiments. Referring to FIG. 6, in a block 601, a computing system implementing part number consolidation can identify characteristics of components in a schematic design for a printed circuit board assembly. In some embodiments, the schematic design for the printed circuit board assembly can include descriptions of the electrical characteristics of the components, such as resistance value, capacitance value, tolerance, power rating, or the like.

In a block 602, the computing system implementing part number consolidation can set compatibility ranges for the characteristics. In some embodiments, the computing system implementing part number consolidation can analyze the characteristics for the components and set upper and lower limits of the compatibility ranges for the characteristics. The computing system implementing part number consolidation can set the upper limits and/or the lower limits of the compatibility ranges based on an analysis to of the schematic design, in response to user input, or the like. In some embodiments, the computing system implementing part number consolidation can analyze the electrical characteristics for the components and determine which of the characteristics correspond to a threshold value rather than a set value. For example, when the component has a tolerance value or a power rating value, the computing system implementing part number consolidation can determine that these values correspond to an endpoint of a range rather than a set value, such as not to exceed the tolerance value or not to fall below the power rating value.

In a block 603, the computing system implementing part number consolidation can determine part numbers available for the components based on the compatibility ranges for the characteristics. The computing system implementing part number consolidation can search a parts library based on the characteristic values and the compatibility ranges to identify part numbers available to be assigned to the components.

In a block 604, the computing system implementing part number consolidation can compare the available part numbers for the components to each other to determine overlap or commonality among the available part numbers. In some embodiments, the computing system implementing part number consolidation also can compare the available part numbers for the components to part numbers or available part numbers in different products to be manufactured at a common facility or across multiple manufacturing facilities as the printed circuit board assembly. The computing system implementing part number consolidation can utilize the commonality or overlap in the available part numbers to identify different combinations of the available part numbers that could be assigned to the components. In some embodiments, the computing system implementing part number consolidation also can analyze the different combinations of the available part numbers based on overall cost.

In a block 605, the computing system implementing part number consolidation can assign one or more of the available part numbers to the components based on commonality among the part numbers. In some embodiments, the computing system implementing part number consolidation can assign a set of the available part number to one or more components, for example, to allow a downstream tool, such as a printed circuit board layout tool, to select for assignment to the components.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    determining, by a computing system, part numbers available for assignment to components represented in a printed circuit board assembly design based, at least in part, on electrical characteristics associated with the components;
    setting, by the computing system, compatibility ranges for the electrical characteristics associated with the components;
    comparing, by the computing system, the available part numbers for the components to each other to identify overlap in the compatibility ranges in the available part numbers across a plurality of the components and to determine a commonality among the available part numbers for a plurality of the components; and
    assigning, by the computing system, one or more of the available part numbers to the components based, at least in part, on the commonality among the available part numbers.

2. The method of claim 1, wherein the determining of the part numbers available for assignment to the components is based, at least in part, on physical characteristics associated with the components.

3. The method of claim 1, wherein the assigning of the one or more of the available part numbers to the components based, at least in part, on the commonality among the available part numbers consolidates a number of different part numbers assigned for the printed circuit board assembly design.

4. The method of claim 1, further comprising comparing, by the computing system, the available part numbers for the components to part numbers associated with a different product, wherein the assigning of the available part numbers to the components is based, at least in part, on a correlation between the available part numbers for the components and the part numbers associated with the different product.

5. The method of claim 4, wherein the printed circuit board assembly design and the different product are to be manufactured at one or more manufacturing facilities.

6. A system comprising:
    a memory device configured to store machine-readable instructions; and
    a computing system including one or more processing devices, in response to executing the machine-readable instructions, configured to:
        determine part numbers available for assignment to components represented in a printed circuit board assembly design;
        compare the available part numbers for the components to each other to determine a commonality among the available part numbers for a plurality of the components;
        compare the available part numbers for the components to part numbers associated with a different product; and
        assign one or more of the available part numbers to the components based, at least in part, on the commonality among the available part numbers and a correlation between the available part numbers for the components and the part numbers associated with the different product.

7. The system of claim 6, wherein the one or more processing devices, in response to executing the machine-readable instructions, are further configured to determine the part numbers available for assignment to the components based, at least in part, on electrical characteristics associated with the components.

8. The system of claim 7, wherein the one or more processing devices, in response to executing the machine-readable instructions, are further configured to:
    set compatibility ranges for the electrical characteristics associated with the components; and
    compare the available part numbers for the components to each other further comprises identifying overlap in the compatibility ranges in the available part numbers across a plurality of the components.

9. The system of claim 6, wherein the one or more processing devices, in response to executing the machine-readable instructions, are configured to determine the part numbers available for assignment to the components is based, at least in part, on physical characteristics associated with the components.

10. The system of claim 6, wherein assigning the one or more of the available part numbers to the components based, at least in part, on the commonality among the available part numbers consolidates a number of different part numbers assigned for the printed circuit board assembly design.

11. An apparatus comprising at least one computer-readable memory device storing instructions configured to cause one or more processing devices to perform operations comprising:
    determining part numbers available for assignment to components represented in a printed circuit board assembly design based, at least in part, on electrical characteristics associated with the components;

setting, by the computing system, compatibility ranges for the electrical characteristics associated with the components;

comparing the available part numbers for the components to each other to identify overlap in the compatibility ranges in the available part numbers across a plurality of the components and to determine a commonality among the available part numbers for a plurality of the components; and assigning one or more of the available part numbers to the components based, at least in part, on the commonality among the available part numbers.

12. The apparatus of claim 11, wherein the determining of the part numbers available for assignment to the components is based, at least in part, on physical characteristics associated with the components.

13. The apparatus of claim 11, wherein the assigning of the one or more of the available part numbers to the components based, at least in part, on the commonality among the available part numbers consolidates a number of different part numbers assigned for the printed circuit board assembly design.

14. The apparatus of claim 11, wherein the instructions configured to cause the one or more processing devices to perform operations further comprising:

comparing the available part numbers for the components to part numbers associated with a different product; and assigning the available part numbers to the components based, at least in part, on a correlation between the available part numbers for the components and the part numbers associated with the different product.

15. The apparatus of claim 14, wherein the printed circuit board assembly design and the different product are to be manufactured at one or more manufacturing facilities.

\* \* \* \* \*